United States Patent
Tsai et al.

(10) Patent No.: US 9,672,862 B2
(45) Date of Patent: Jun. 6, 2017

(54) METHOD OF WRITING SERVO INFORMATION ON A STORAGE MEDIUM AND ARRANGEMENT FOR WRITING SERVO INFORMATION ON A STORAGE MEDIUM

(71) Applicant: Marvell International Ltd., Hamilton (BM)

(72) Inventors: Wen Huei Jack Tsai, Singapore (SG);
Siang Huei Leong, Singapore (SG);
Baoxi Xu, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/022,493

(22) PCT Filed: Sep. 17, 2014

(86) PCT No.: PCT/SG2014/000444
§ 371 (c)(1),
(2) Date: Mar. 16, 2016

(87) PCT Pub. No.: WO2015/041605
PCT Pub. Date: Mar. 26, 2015

(65) Prior Publication Data
US 2016/0232935 A1    Aug. 11, 2016

(30) Foreign Application Priority Data

Sep. 17, 2013    (SG) .................................. 201307022

(51) Int. Cl.
G11B 11/00    (2006.01)
G11B 11/105    (2006.01)
G11B 5/00    (2006.01)

(52) U.S. Cl.
CPC ...... *G11B 11/10578* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,396,773 B1 | 5/2002 | Kuo | |
| 6,614,608 B1 * | 9/2003 | Belser | G11B 5/5965 360/135 |
| 6,771,450 B1 | 8/2004 | Okuda et al. | |
| 6,816,330 B2 | 11/2004 | Ikeda et al. | |

(Continued)

FOREIGN PATENT DOCUMENTS

WO    WO-99/30318 A1    6/1999

OTHER PUBLICATIONS

International Search Report and Written Opinion of the ISA for PCT/SG2014/000444, ISA/AU, Woden ACT, mailed Nov. 27, 2014.

*Primary Examiner* — Peter Vincent Agustin

(57) ABSTRACT

According to embodiments of the present invention, a method of writing servo information on a storage medium is provided. The method includes applying heat to a servo portion of a storage medium, and applying a magnetic field to the servo portion that is heated to write servo information on the servo portion. According to further embodiments of the present invention, an arrangement for writing servo information on a storage medium and a method of forming a storage medium are also provided.

14 Claims, 9 Drawing Sheets

(56) References Cited

U.S. PATENT DOCUMENTS

| | | | |
|---|---|---|---|
| 2001/0048568 A1* | 12/2001 | Ikeda | G11B 5/59633 360/59 |
| 2002/0118477 A1* | 8/2002 | Ikeda | B82Y 10/00 360/55 |
| 2003/0035235 A1 | 2/2003 | Ikeda et al. | |
| 2004/0027728 A1* | 2/2004 | Coffey | G11B 5/012 360/313 |
| 2006/0280095 A1* | 12/2006 | Tsukagoshi | G03H 1/0256 369/103 |
| 2008/0080335 A1* | 4/2008 | Matsumoto | G11B 7/0065 369/44.23 |
| 2010/0128382 A1* | 5/2010 | Maeda | G11B 5/012 360/75 |
| 2011/0075545 A1* | 3/2011 | Nagatomi | G11B 7/0909 369/112.23 |
| 2011/0141867 A1* | 6/2011 | Mikami | G11B 7/00781 369/47.19 |
| 2013/0128378 A1* | 5/2013 | Yuan | G11B 5/02 360/59 |
| 2016/0232935 A1* | 8/2016 | Tsai | G11B 11/10578 |

* cited by examiner

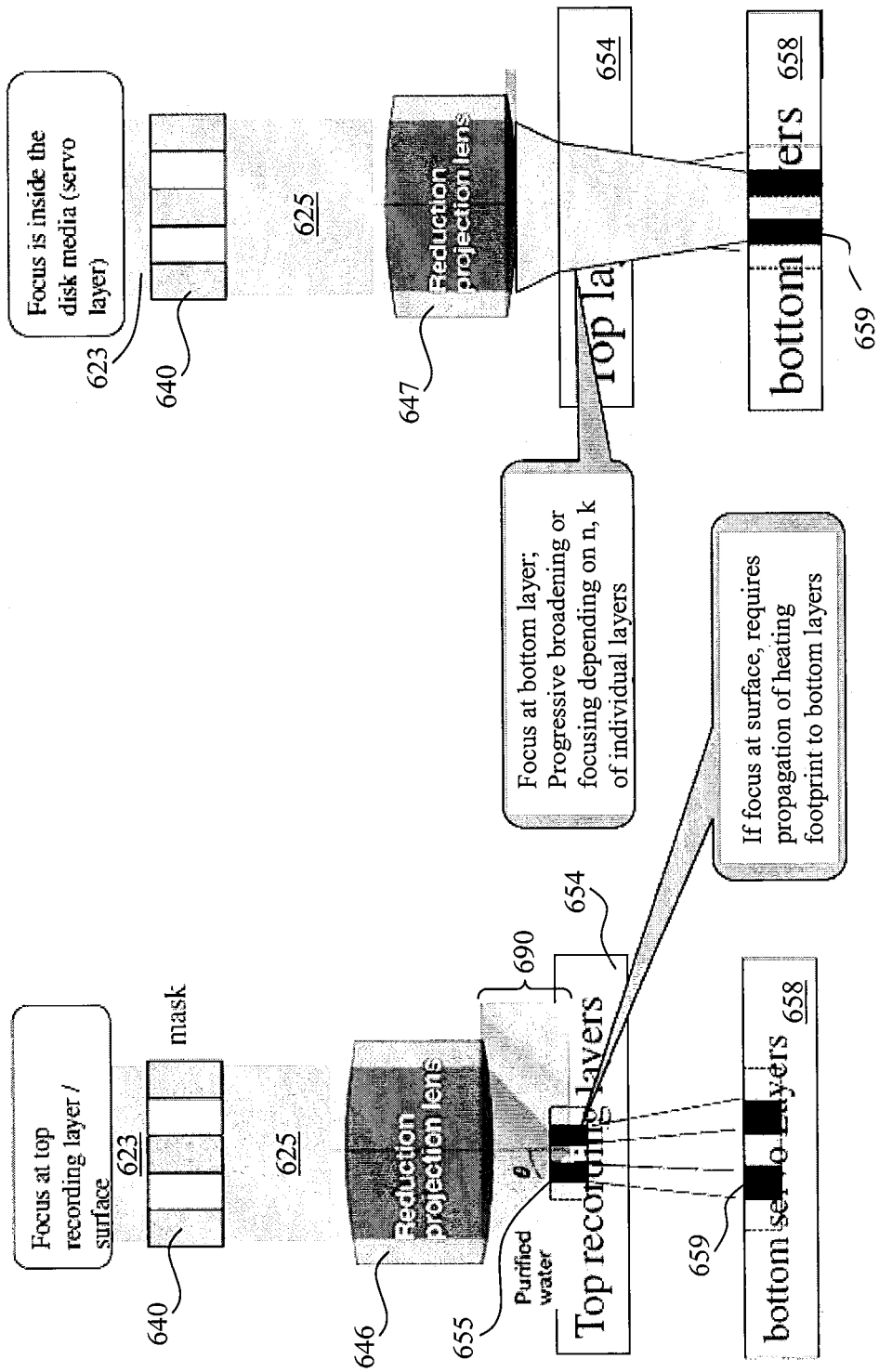

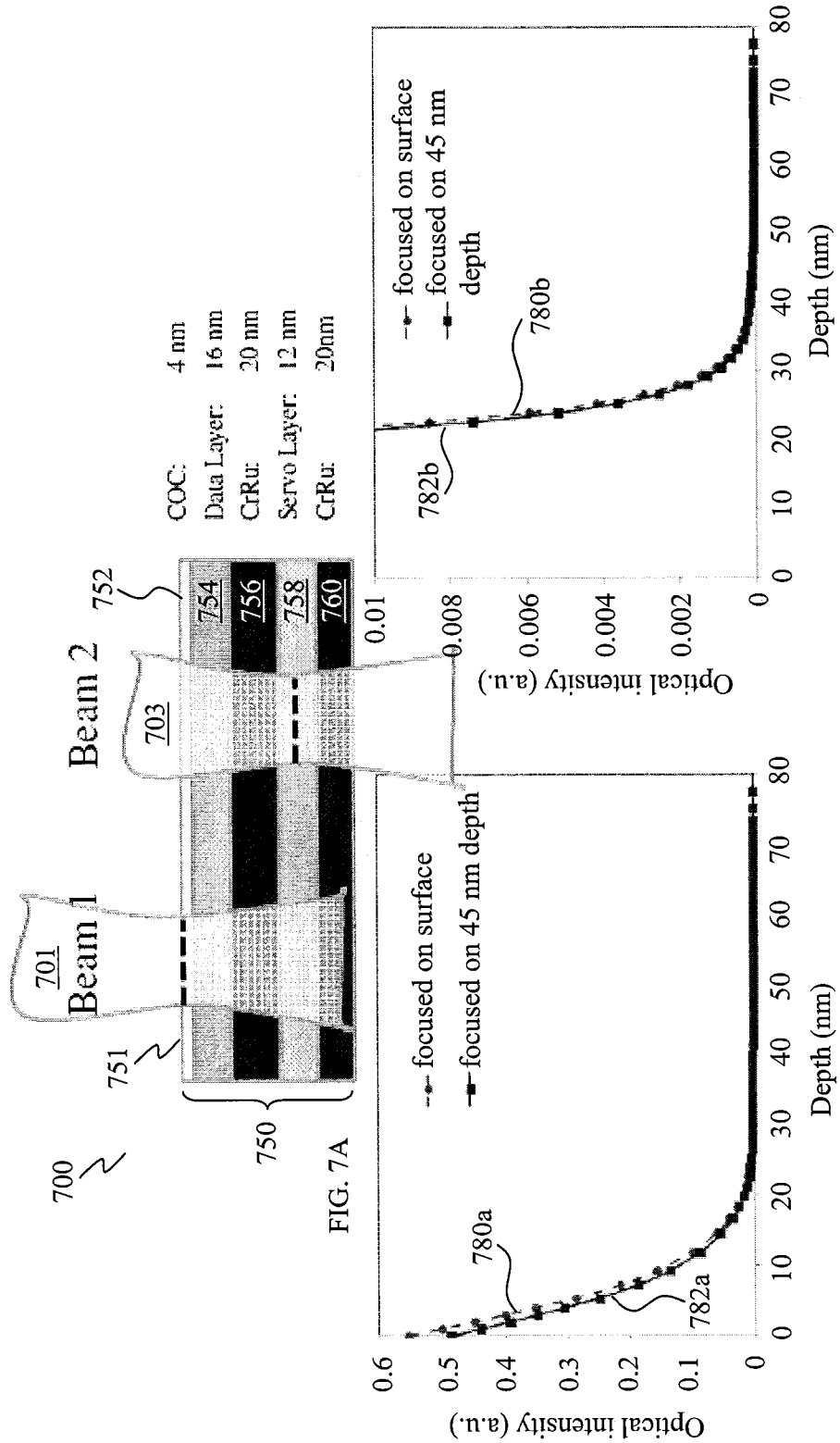

METHOD OF WRITING SERVO INFORMATION ON A STORAGE MEDIUM AND ARRANGEMENT FOR WRITING SERVO INFORMATION ON A STORAGE MEDIUM

CROSS-REFERENCE TO RELATED APPLICATION

This application is a 371 U.S. National Stage of International Application No. PCT/SG2014/000444, filed Sep. 17, 2014, which claims the benefit of priority of Singapore patent application No. 201307022-2, filed Sep. 17, 2013, the content of both being hereby incorporated herein by reference in their entirety for all purposes.

TECHNICAL FIELD

Various embodiments relate to a method of writing servo information on a storage medium, an arrangement for writing servo information on a storage medium, and a method of forming a storage medium.

BACKGROUND

In a hard disk drive (HDD), there are servo spokes and servo sectors in the spokes that contain servo information on the read/write (RW) head's location with respect to the spinning disk of the HDD. The information can include fields such as AGC (automatic gain control), SAM (servo address mark), Track ID (track identification), Position Error Signal (PES) bursts and other information. The servo information is critical for the drive to function properly as the RW head needs to go to each target location to read or write data, and the servo information lets the drive know that it is precisely at which location, or how much to traverse to reach the targeted location.

To generate the servo information in the servo spokes, it is necessary to first write the servo information in the form of servo patterns. For conventional HDDs, these are accomplished by a few approaches, such as Media Servo Track Writing, internal self-servo write, internal write using push-pin and in some cases, contact servo printing (CSP). The first 3 approaches (used by a majority of HDDs manufacturers) use a RW head which needs to traverse to each track to write the servo information. For dedicated servo HDDs, a wide writer approach is employed, using shingled magnetic recording approach.

However as the areal density of HDDs increase, the width of the tracks in the HDD is reduced correspondingly. This increase in track density (tracks per inch, TPI) is generally much more than the increase in linear density. When TPI increases, there are more tracks to write (for the approaches using RW head) during servo writing and the corresponding time taken to complete servo writing increases significantly and affects throughput. Accordingly, there is a problem in that an increasing TPI and reducing writer dimensions result in increased servo pattern writing time and affect throughput.

In the dedicated servo approach, the servo layer is positioned below the data layer. The servo writing problem is made more challenging due to the need to write to the separate servo layer. It is harder to write servo pattern on this dedicated servo layer using a conventional head based approach because of the following. The larger head media spacing (HMS) makes the servo layer harder to write by a conventional RW head due to insufficient write field. Further, the larger head media spacing (HMS) makes it difficult for the servo layer to be written by conventional means (using flying head) while achieving very high resolution and good track pitch. In addition, the magnetic properties of the servo layer need to become higher as that of the data layer increases to support higher areal density, and this also makes the requirements higher on a suitable RW head for servo writing. For example, there may be need for the servo layer ku (magnetic anisotropy constant) and He (coercivity) to become higher in relation to the higher ku and He of the data layer. Further, the dimension of the writer on the slider is getting smaller (longer servo write time) and the achievable write field is becoming less.

Thus, there is need for an approach to write servo patterns that may address the above-mentioned issues, including for example a fast method to create one or more servo patterns on (conventional) disks.

SUMMARY

According to an embodiment, a method of writing servo information on a storage medium is provided. The method may include applying heat to a servo portion of a storage medium, and applying a magnetic field to the servo portion that is heated to write servo information on the servo portion.

According to an embodiment, an arrangement for writing servo information on a storage medium is provided. The arrangement may include an optics arrangement configured to propagate a laser light, a mask configured to receive the laser light, the mask including at least one transmissive portion configured to selectively pass a part of the laser light that is received to irradiate at least one region of a servo portion of a storage medium to heat the at least one region, and at least one non-transmissive portion configured to selectively block another part of the laser light that is received, and at least one magnet configured to generate a magnetic field to the servo portion for writing servo information on the servo portion.

According to an embodiment, a method of forming a storage medium is provided. The method may include forming a servo layer of a storage medium, applying heat to a servo portion of the servo layer, and applying a magnetic field to the servo portion that is heated to write servo information on the servo portion.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 6A and 6B show schematic views illustrating focusing of a laser light at a data layer and a servo layer respectively of a storage medium.

FIG. 7A shows a schematic of an optical model, while FIGS. 7B and 7C show results of intensity decay based on the optical model of FIG. 7A.

FIG. 8A shows a schematic of an optical model, while

DETAILED DESCRIPTION

Figure 1A:
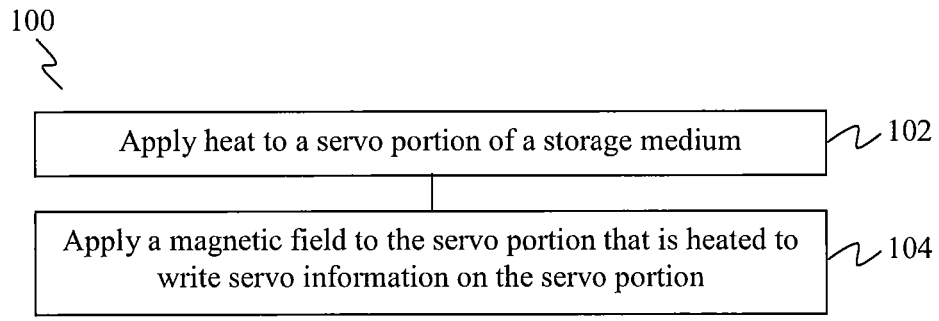
FIG. 1A shows a flow chart illustrating a method of writing servo information on a storage medium, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may effectively address the above-mentioned issues in relation to conventional approaches to provide fast and effective writing of one or more servo patterns without requirements of a special read/write (RW) head.

Various embodiments may provide or enable servo printing via projection.

Various embodiments may relate to writing of servo pattern for dedicated servo of hard disk drive (HDD).

Various embodiments may provide a method to write one or more servo patterns on a servo layer or servo sectors of hard disk drives (HDD). The method may include using a patterned mask that may correspond to a required servo pattern or part of a servo pattern to define a heating area. The method may include using light, for example of a short wavelength such as in the deep ultraviolet (DUV) range, through a mask, to heat up the magnetic material on which the servo pattern is to be written. The method may include using light, for example with a short duration such as less than sub-nanosecond, through a mask, to heat up the magnetic material on which the servo pattern is to be written. The method may include using a heat assisted approach to write magnetic servo patterns. The heat for the heat assisted approach may be from the light transmitted into the material and absorbed and/or from heat propagated from other layers of the disk medium. In various embodiments, the choice of the interlayer between the data and servo magnetic layers in a dedicated servo configuration may influence or affect the degree of assisted writing in the servo layer. The quality of the servo pattern may be checked by a read sensor.

Various embodiments may provide an approach to write servo pattern via projection servo printing. In this approach, light, for example from a laser operating in the deep ultraviolet (DUV) wavelengths (e.g. about 193 nm or about 248 nm), may be used. This light may first pass through a collimator and a beam homogenizer/collimator (which may provide a flat top beam profile) and may then transmit through a mask into a reduction projection lens and may be focused onto the target magnetic layer where servo information or servo pattern is to be written. The focused light may then heat up the magnetic layer and may create a thermal footprint corresponding to the pattern of the mask. The associated heating may result in a reduction in the coercivity of the magnetic material. At the same time, a magnetic field may be applied that is just able to switch and saturate the heated magnetic material with reduced coercivity but may otherwise be unable to switch the magnetization of the unheated regions. The resulting magnetic pattern written may correspond to that of the pattern of the mask and also may correspond to the desired servo pattern at that target region. Since the light through the mask and focused onto the magnetic layer may only write a small region of the disk area, it may be necessary to provide relative motion between the disk and the optics/magnetic field so that other regions of the disk may be also written to generate an entire servo pattern on the disk (or storage medium). After the entire servo pattern is generated by the above-mentioned approach, a read head or read sensor may be used to verify the servo pattern quality if needed. The entire process may be integrated into a media fabrication line to replace current servo writing approaches for conventional disk media or may be used for dedicated servo disk media.

Various embodiments may provide one or more of the following features or advantages over the traditional approaches in servo writing.

(1) Various embodiments do not require a R/W Head for writing servo information or conventional servo track writing with a R/W Head: For a dedicated servo configuration, the requirements on the RW head to write the separate servo layer at larger head-media-spacing HMS is higher. Various embodiments may not or do not require a RW head and therefore is not subject to availability of suitable heads.

(2) Faster process by step and flash: Various embodiments may pattern many tracks per operation due to the larger number of tracks per mask, compared to the single track per disk rotation using a R/W head in conventional approaches. For example, a mask area may cover a servo pattern for many tracks and a single laser illumination with a magnetic field may write a large portion of many tracks, as compared to a write head which can only write one track at one time. By using a laser illumination with a magnetic field (Flash) and step to a new area, to repeat the same process, it is expected that time to servo pattern whole disk is much less than conventional single track by track write using a magnetic write head. The decrease in time needed to servo write by the method of various embodiments may therefore directly translate to a higher throughput and increased cost savings.

(3) Compatibility with dedicated servo media stack: Various embodiments may be compatible with a dedicated servo media stack, unlike conventional in-drive servo writing where the RW head in the HDD cannot write to the dedicated servo layer.

FIG. 1A shows a flow chart 100 illustrating a method of writing servo information on a storage medium, according to various embodiments.

At 102, heat is applied to a servo portion of a storage medium.

At 104, a magnetic field is applied to the servo portion that is heated to write servo information on the servo portion.

In various embodiments, at 104, the magnetic field that is applied may be in a direction orthogonal to a major surface (e.g. top surface) of the storage medium. In this way, a magnetic portion or magnetic layer of the storage medium may have perpendicular magnetic anisotropy or perpendicular magnetization orientation.

In the method of various embodiments, the heat that is applied may reduce the magnetic coercivity of the servo portion, e.g. the magnetic coercivity of the magnetic materials or the magnetic regions of the servo portion. The magnetic field that is applied may interact with the magnetic materials or magnetic regions of the servo portion to write the servo information on the servo portion. For example, the magnetic field may switch the magnetic orientations of the magnetic regions of the servo portion for writing the servo information.

In various embodiments, at 102, the servo portion of the storage medium may be irradiated with a laser light so as to apply heat to the servo portion.

In various embodiments, the method may further include passing the laser light through a mask, where the mask may include at least one transmissive portion configured to selectively pass a part of the laser light to irradiate at least one region of the servo portion, and at least one non-transmissive portion configured to selectively block another part of the laser light. This may mean that a part of the laser light may pass through the transmissive portion of the mask to irradiate at least one region of the servo portion, thereby heating the at least one region and reducing the magnetic coercivity associated with the at least one region. Application of the magnetic field may then switch the magnetic orientation of the at least one region (e.g. magnetic region) so as to define the servo information to be written. In this way, for example, the servo information and the corresponding servo pattern may be defined on one or more regions (e.g. magnetic regions) of the servo portion according to the shape or configuration of the mask, for example according to the arrangement of the at least one transmissive portion (e.g. one or more transmissive portions) and the at least one non-transmissive portion (e.g. one or more non-transmissive portions) on the mask.

In various embodiments, the method may further include focusing the laser light towards the servo portion to irradiate the servo portion, e.g. using a reduction projection lens. For example, the laser light may be focused to the servo portion or the laser light may be focused at a surface (e.g. a major surface) of the storage medium or the laser light may be focused at a data layer of the storage medium.

In various embodiments, the method may further include collimating the laser light prior to irradiating the servo portion, e.g. using an optical collimator, for example a collimation lens or collimation optics. This may generate a near parallel beam with low divergence.

In various embodiments, the method may further include shaping a beam profile of the laser light prior to irradiating the servo portion. e.g. using a beam homogenizer. In various embodiments, the laser light may be shaped or homogenized to form or generate an at least substantially uniform beam profile, e.g. having a flat top beam profile or a top hat beam profile. By shaping the beam profile of the laser light, a homogeneous irradiation of the servo portion may be provided. The beam profile of the laser light may be or may relate to a power or intensity profile of the laser light. In this way, for example, a uniform power or intensity may be provided across the beam profile.

In various embodiments, the method may further include DC erasing the storage medium prior to applying the magnetic field to the servo portion that is heated to write the servo information on the servo portion. This may include applying another magnetic field of a direction that may be opposite to a direction of the magnetic field applied to the servo portion that has been heated for writing servo information on the servo portion. The other magnetic field may be in a direction orthogonal to a major surface (e.g. top surface) of the storage medium. In this way, a magnetic portion or layer of the storage medium may have perpendicular magnetic anisotropy or perpendicular magnetization orientation. In various embodiments, the entire storage medium may be DC erased.

In various embodiments, the method may further include splitting the laser light (e.g. using a beamsplitter) into a first light portion to irradiate the servo portion through a first surface of the storage medium, and a second light portion to irradiate the servo portion through a second surface of the storage medium, the second surface being opposite to the first surface. Each of the first surface and the second surface may be a major surface of the storage medium, for example the first surface may be the top surface (or bottom surface) and the second surface may be the bottom surface (or top surface) of the storage medium. In this way, double sided writing of servo information or double sided projection servo printing may be provided.

In various embodiments, each of the first light portion and the second light portion may irradiate a different region of the servo portion.

In various embodiments, the first light portion may be passed through the mask while the second light portion may be passed through another mask. The other mask may be similar to the mask and may be as described in the context of the mask. This may mean, for example, that the other mask may include at least one transmissive portion and at least one non-transmissive portion.

In the context of various embodiments, the laser light may include an ultraviolet (UV) light. For example, the laser light may be a deep ultraviolet (DUV) light, e.g. having a wavelength of about 193 nm or about 248 nm, for example provided by an excimer laser source.

In the context of various embodiments, the servo portion may be comprised in a servo layer of the storage medium, the servo layer being arranged beneath a data layer of the storage medium. This may mean that the servo layer may be separate from the data layer. This may also mean that the data layer and the servo layer may be arranged one over the other. The servo layer may be spaced apart from the data layer. By having a separate servo layer, the storage medium may be a dedicated servo storage medium, where the separate servo layer may be a dedicated servo layer. The dedicated servo layer may contain servo information which may be used as location information for a read/write (RW) head relative to a track, e.g. a data track, for reading or writing data. The dedicated servo layer may not contain data. The data may be contained in a data layer of the storage medium.

In various embodiments, the method may further include causing relative movement between the laser light and the storage medium. This may mean that at least one of the laser light or the storage medium may be moved relative to the other. For example, the storage medium may be rotated or the laser light may be re-directed to another part of the storage medium.

In various embodiments, the method may further include removing the magnetic field after writing the servo information on the servo portion.

In various embodiments, the method may further include removing the heat or the laser light after writing the servo information on the servo portion.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

Figure 1B:
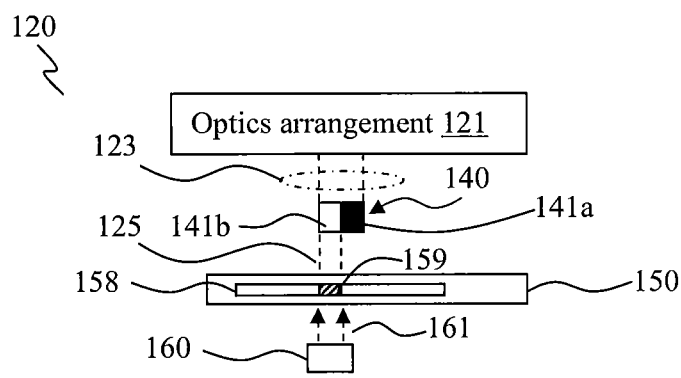
FIG. 1B shows a schematic view of an arrangement for writing servo information on a storage medium, according to various embodiments.

FIG. 1B shows a schematic view of an arrangement 120 for writing servo information on a storage medium 150, according to various embodiments. The arrangement 120 includes an optics arrangement 121 configured to propagate a laser light 123, a mask 140 configured to receive the laser light 123, the mask 140 including at least one transmissive portion 141b configured to selectively pass a part 125 of the laser light 123 that is received to irradiate at least one region 159 of a servo portion 158 of a storage medium 150 to heat the at least one region 159, and at least one non-transmissive portion 141a configured to selectively block another part of the laser light 123 that is received, and at least one magnet 160 configured to generate a magnetic field 161 to the servo portion 158 for writing servo information on the servo portion 158.

In other words, an arrangement 120 for writing servo information on a storage medium 150 may be provided. The arrangement 120 may include an optics arrangement 121 which may propagate a laser light 123. In various embodiments, the optics arrangement 121 may further include directing the laser light 123 and/or re-directing laser light 123, for example changing the propagation direction of the laser light 123, e.g. by means of one or more light directors (e.g. mirror). In various embodiments, the optics arrangement 121 may include a laser source configured to generate or provide the laser light 123. The arrangement 120 may further include a mask 140 which may include one or more transmissive portions 141b which may allow the laser light 123 to pass through, as well as one or more non-transmissive portions 141a which may block passage of the laser light 123. In this way, the mask 140 may be a patterned mask. The mask 140 may have a predetermined configuration, based on the arrangement of the one or more transmissive portions 141b and the one or more non-transmissive portions 141a, which may be transferred to the servo portion 158 of the storage medium 150. This may mean that the pattern of the laser light 123 incident or provided to the servo portion 158 may be based on the predetermined configuration or pattern of the mask 140. Heat may be generated at the region (e.g. magnetic region) 159 as a result of the part 125 of the laser light 123 incident on or irradiating the region 159, which may result in a reduction in the magnetic coercivity associated with the region 159. The arrangement 120 may further include one or more magnets 160 which may generate a magnetic field 161 to interact with the region 159 and the servo portion 158 for writing servo information on the servo portion 158. As a result of the reduction in the magnetic coercivity associated with the region 159 and the interaction of the magnetic field 161 with the region 159, the magnetization orientation of the magnetic material associated with the region 159 may be changed or switched in direction.

In various embodiments, the magnetic field 161 may be in a direction orthogonal to a major surface (e.g. top surface) of the storage medium 150. In this way, a magnetic layer of the storage medium 150 may have peipendicular magnetic anisotropy or perpendicular magnetization orientation.

In various embodiments, the optics arrangement 121 may include a reduction projection lens configured to focus the part 125 of the laser light 123 selectively passed through the mask 140 towards the servo portion 158 to irradiate the at least one region 159 of the servo portion 158. For example, the part 125 of the laser light 123 may be focused to the servo portion 158 or focused at a surface (e.g. a major surface) of the storage medium 150 or focused at a data layer of the storage medium 150. The reduction projection lens may be optically coupled to the mask 140. The reduction projection lens may be arranged between the mask 140 and the storage medium 150 where the servo information is to be written on. In various embodiments, the at least one magnet 160 may be arranged opposite to the reduction projection lens with the storage medium 150 in between.

In various embodiments, the optics arrangement 121 may include an optical collimator configured to collimate the laser light 123. The optical collimator may be arranged prior to the mask 140. This may mean that the laser light 123 may first reach the optical collimator before reaching the mask 140.

In various embodiments, the optics arrangement 121 may include a beam homogenizer configured to shape a beam profile of the laser light 123. This may generate a homogeneous (or uniform) beam profile of the laser light 123, e.g. a flat top beam profile or a top hat beam profile. The beam homogenizer may be arranged prior to the mask. This may mean that the laser light 123 may first reach the beam homogenizer before reaching the mask 140. The beam homogenizer may be arranged after the optical collimator. This may mean that the laser light 123 may first reach the optical collimator before reaching the beam homogenizer.

In various embodiments, the optics arrangement 121 may include a beamsplitter configured to split the laser light 123 into a first light portion and a second light portion, wherein the optics arrangement 121 may be configured to propagate the first light portion through the mask 140 to irradiate the servo portion 158 through a first surface of the storage medium 150, and further configured to propagate the second light portion through another mask to irradiate the servo portion 158 through a second surface of the storage medium 150, the second surface being opposite to the first surface. In this way, double sided writing of servo information or double sided projection servo printing may be enabled. In various embodiments, the other mask may include at least one transmissive portion configured to selectively pass a part of the second light portion that is received, and at least one non-transmissive portion configured to selectively block another part of the second light portion that is received. In various embodiments, each of the first light portion and the second light portion may irradiate a different region of the servo portion 158.

In various embodiments, the laser light 123 may include an ultraviolet (UV) light, e.g. a deep ultraviolet (DUV) light, for example having a wavelength of about 193 nm or about 248 nm. In various embodiments, the optics arrangement 121 may include an excimer laser source to provide the UV or DUV laser light.

In various embodiments, the servo portion 158 may be comprised in a servo layer of the storage medium 150, the servo layer being arranged beneath a data layer of the storage medium 150. This may mean that the storage medium 150 may be a dedicated servo storage medium, having a dedicated servo layer that may contain servo information. The dedicated servo layer may not contain data.

In various embodiments, the arrangement 120 may further include a DC erasing magnet arrangement configured to generate another magnetic field to DC erase the storage medium 150. The other magnetic field may be applied in a direction that may be opposite to a direction of the magnetic field 161. In various embodiments, the DC erasing magnet arrangement may be employed to DC erase the entire storage medium 150. In various embodiments, DC erasing may be carried out prior to writing the servo information on the servo portion 158.

In various embodiments, the arrangement 120 may further include a read sensor or read head configured to read the servo information written on the servo portion 158 of the storage medium 150.

In various embodiments, the optics arrangement 121, the mask 140 and the at least one magnet 160 may be movable relative to the storage medium 150 or vice versa.

Figure 1C:
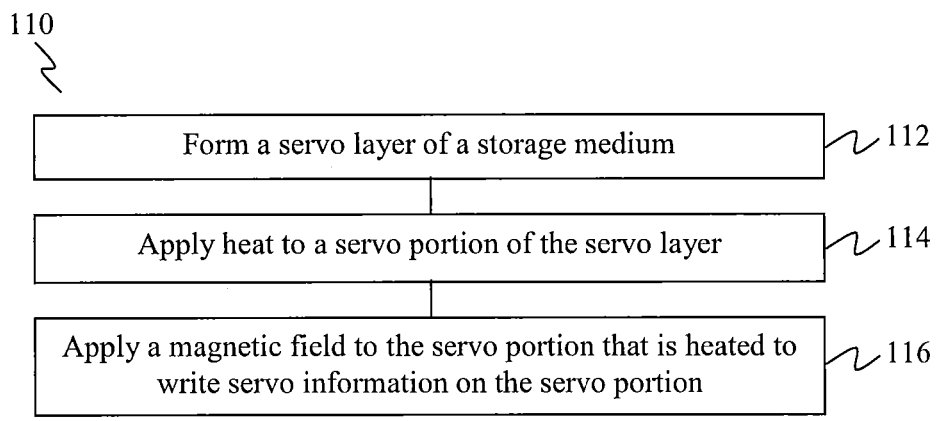
FIG. 1C shows a flow chart illustrating a method of forming a storage medium, according to various embodiments.

FIG. 1C shows a flow chart 110 illustrating a method of forming a storage medium, according to various embodiments.

At 112, a servo layer of a storage medium is formed.

At 114, heat is applied to a servo portion of the servo layer.

At 116, a magnetic field is applied to the servo portion that is heated to write servo information on the servo portion.

In various embodiments, at 112, the servo layer may be formed on a substrate or carrier, or on top of underlayers above a substrate. For example, the servo layer may be deposited on the substrate or carrier, or on top of underlayers formed on a substrate.

In various embodiments, the servo portion may be a part of the servo layer or the entire servo layer.

In various embodiments, the method may further include forming a data layer of the storage medium over the servo layer, prior to applying heat to the servo portion. The data layer may also be formed on top, but separated by one or more interlayers, of the servo layer. This may mean that the servo layer and the data layer may be formed prior to writing of servo information on the servo portion. In various embodiments, the method may further include forming various layers of the storage medium up to a carbon overcoat (COC) prior to applying heat to the servo portion. Subsequently, after writing of the servo information, a lubricant (lube) and post process may be carried out. In various embodiments, procedures at 114 and 116 may be carried out in air.

In various embodiments, the method may further include forming a data layer of the storage medium over the servo layer after the servo information is written on the servo portion. This may mean that writing of servo information on the servo portion may be carried out prior to forming the data layer. Subsequently, the method may further include forming various layers of the storage medium up to a carbon overcoat (COC). A lubricant (lube) and post process may be carried out thereafter. In various embodiments, procedures at 114 and 116 may be carried out in vacuum. In various embodiments, the method may further include forming one or more interlayers of the storage medium over the servo layer, prior to forming the data layer.

It should be appreciated that one or more steps of the method of writing servo information on a storage medium as described above in the context of the flow chart 100, for example irradiating the servo portion with a laser light, passing the laser light through a mask, etc., and descriptions relating thereto may be applicable to the method of forming a storage medium in the context of the flow chart 110.

In the context of various embodiments, the servo portion may include a plurality of servo tracks.

In the context of various embodiments, the servo information may be in the form of one or more servo patterns.

In the context of various embodiments, the servo information may refer to information which may be used as or may provide location information for a read/write (RW) head relative to a location or a track, e.g. a data track.

In the context of various embodiments, the servo information and the servo pattern may be defined by regions of the servo portion which may be affected (e.g. switching of magnetization orientations) by the magnetic field applied as well as regions of the servo portion not affected by the magnetic field applied.

In the context of various embodiments, the servo portion may be a magnetic portion.

In the context of various embodiments, each of the servo layer and the data layer may be a magnetic layer.

In the context of various embodiments, the storage medium may be a dedicated servo storage medium having a dedicated servo layer arranged below and separate from a data or recording layer.

In the context of various embodiments, the storage medium may be part of a hard disk drive (HDD).

In the context of various embodiments, the laser light may be a continuous wave laser light or a pulsed laser light. In various embodiments, the pulsed laser light may have a pulse duration in a range of between about 1 picosecond (ps) and about 1 second (s), for example between about 1 ps and about 1 ms, between about 1 ps and about 1 μs, between about 1 ps and about 1 ns, between about 1 μs and about 1 s, between about 1 ms and about 1 s, between about 1 ns and about 1 s, between about 1 ns and about 1 μs, between about 1 ns and 1 ms, or between about 1 μs and about 1 ms.

Figure 2:
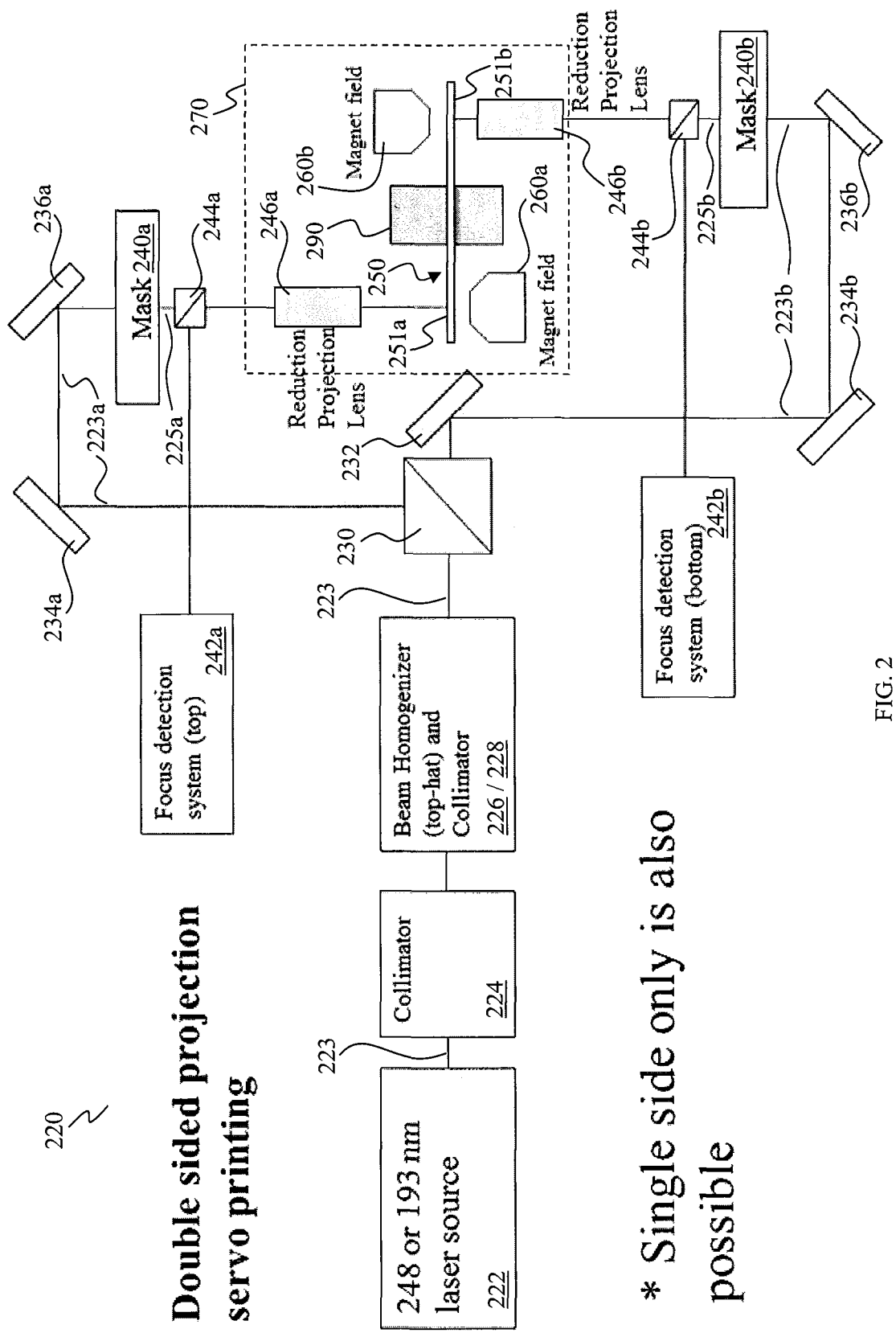
FIG. 2 shows a schematic view of a set-up for double sided projection printing, according to various embodiments.

FIG. 2 shows a schematic view of an arrangement or set-up 220 for double sided projection servo printing, according to various embodiments. However, it should be appreciated that the arrangement 220 may also be used for single sided projection servo printing.

In projection servo printing, light, for example from a laser or laser source 222 operating in the deep ultraviolet (DUV) wavelengths, may be used. Non-limiting examples of wavelengths available in DUV that may be used include 193 nm or 248 nm. The light 223 from the laser source 222 may be continuous wave (CW) or pulsed, for example depending on the application and/or the servo pattern (or servo-information) to be written.

The laser light or laser beam 223 may first pass through a collimator or an optical collimator (e.g. a collimation lens) 224. The collimator 224 may produce a near parallel beam 223 with very low divergence. Next, the light 223 may pass through a beam homogenizer 226, which may include another collimator 228, and the beam profile of the laser light 223 may be shaped to that of a flat top or top-hat profile. In this way, the laser light 223 may have at least substantially uniform power or intensity across a substantial portion of the beam profile or across the entire beam profile.

The laser light 223 may be split by means of a beamsplitter 230 into a first light portion 223a to be provided or directed to a first mask 240a, and a second light portion 223b to be provided or directed to a second mask 240b. The beamsplitter 230 may, for example, provide a 50:50 split ratio, although other split ratios may be employed. The first light portion 223a may be directed to the first mask 240a by means of one or more light directors or mirrors 234a, 236a. The second light portion 223b may be directed to the second mask 240b by means of one or more light directors or mirrors 232, 234b, 236b.

The first mask 240a may selectively pass one or more parts 225a of the first light portion 223a, depending on the configuration or pattern of the first mask 240a, while the second mask 240b may selectively pass one or more parts 225b of the second light portion 223b, depending on the configuration or pattern of the second mask 240b. Each of the first mask 240a and the second mask 240b may include at least one transmissive portion (not shown) to selectively pass light and at least one non-transmissive portion (not shown) to selectively block light.

Using the first light portion 223a and the first mask 240a as an example, one or more light parts 225a may pass through the first mask 240a. The first mask 240a may have a configuration or pattern, for example having one or more transmissive portions and one or more non-transmissive portions, that may correspond to the servo pattern or servo information to be written onto a portion of the storage medium (e.g. a disk) 250, for example written to a servo portion of the storage medium 250. The storage medium 250 may be coupled to a spindle 290 which may rotate the storage medium 250.

The light part(s) 225a selectively transmitted through the first mask 240a may then further pass or go through a first reduction projection lens 246a and may be focused onto the target magnetic layer (where the servo pattern or servo information is to be written) in the storage medium (e.g. a disk medium or a disk media stack) 250. The focused light 225a may pass or be transmitted through a top surface 251a of the storage medium. The focused light 225a may then heat up the magnetic layer which the focused light 225a may be incident on or irradiated onto and may create a thermal footprint corresponding to the pattern of the first mask 240a. The associated heating may result in reduction in the magnetic coercivity of the magnetic material. At the same time, a magnetic field, for example provided or generated by one or more first magnets 260a may be applied that may just be able to switch and saturate the heated magnetic material (or heated regions) with reduced coercivity but may be otherwise unable to switch the magnetization of the unheated regions. The resulting magnetic pattern may correspond to the pattern of the first mask 240a and may also correspond to the desired servo pattern to be provided at the target region of the storage medium 250.

The size of the thermal footprint may depend on not only the light distribution, but also heat energy accumulation and diffusion. A shorter pulse light heating may reduce the diffusion during heating and may make the thermal footprint smaller.

It should be appreciated that the above-described operations with regard to the first light portion 223a, the first mask 240a, the first reduction projection lens 246a and the first magnet(s) 260a may be similarly applicable to the second light portion 223b, the second mask 240b, the second reduction projection lens 246b and one or more second magnets 260b for writing servo information on the storage medium via a bottom surface 251b of the storage medium. Therefore, a double sided projection servo printing may be provided.

In various embodiments, a beamsplitter 244a may be provided to direct a portion of the light 225a to a focus detection system or device 242a to detect a focus of the light portion 225a. Another beamsplitter 244b may also be provided to direct a portion of the light 225b to a focus detection system or device 242b to detect a focus of the light portion 225b.

The arrangement 220 may also be used for single-sided projection servo printing. For example, this may be achieved using either the first light portion 223a or the second light portion 223b or the laser light 223 directly, without splitting the laser light 223 into separate light portions.

Figure 3:
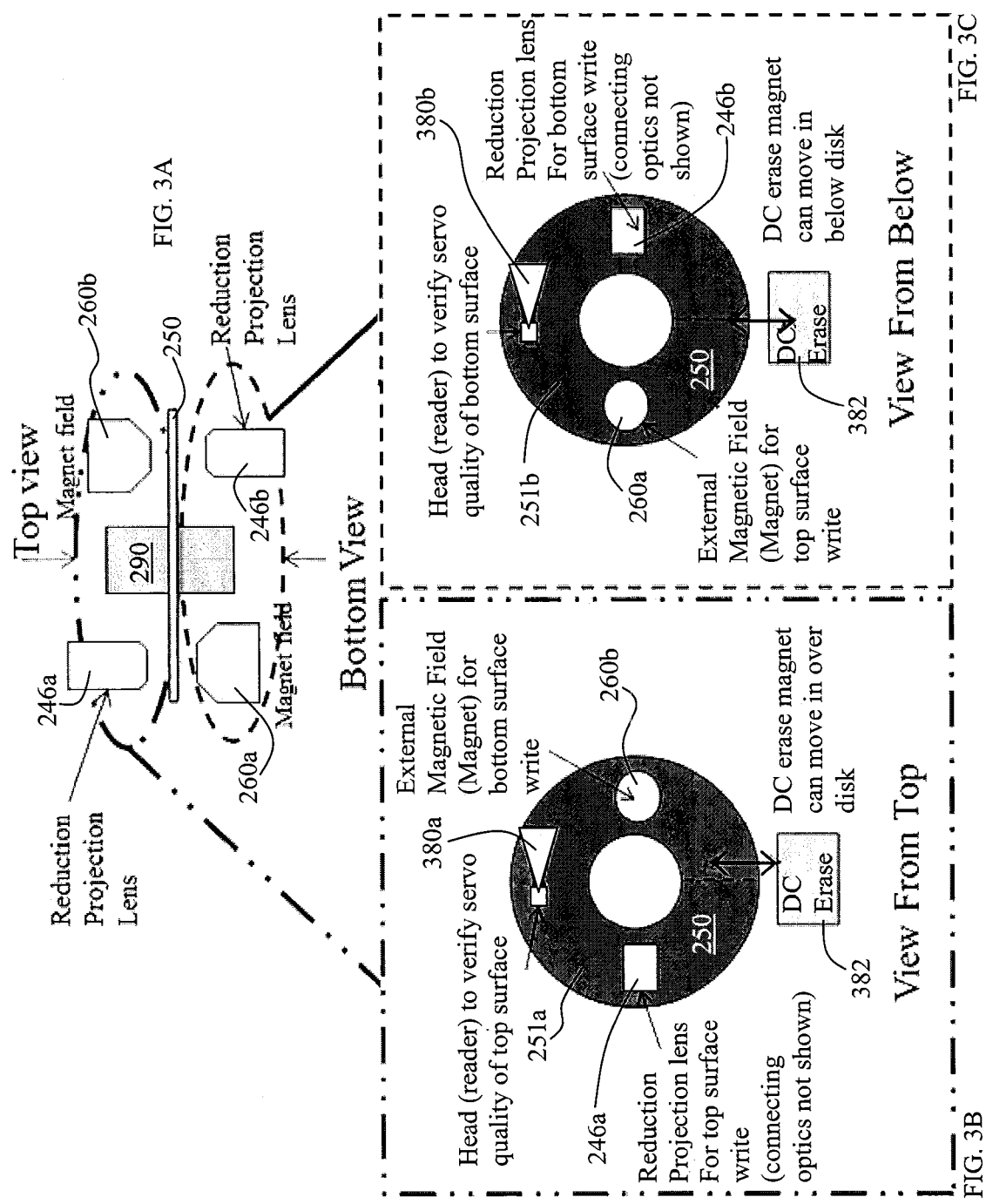
FIGS. 3A to 3C show schematic views of part of the set-up of the embodiment of FIG. 2.

FIGS. 3A to 3C show schematic views of part of the arrangement or set-up 220, illustrating the arrangement of some of the components of the setup 220 shown within the dashed box 270 in FIG. 2, from top and bottom views of the storage medium (e.g. disk) 250. As shown in FIGS. 3B and 3C, a head/reader or read sensor 380a, 380b may be provided in the arrangement 220 (FIG. 2) and used to verify the quality of the patterned or written servo information. Further, a DC erase magnet or a DC erasing magnet arrangement 382 may be provided in the arrangement 220 (FIG. 2) and employed to DC erase the storage medium 150.

Figure 4:
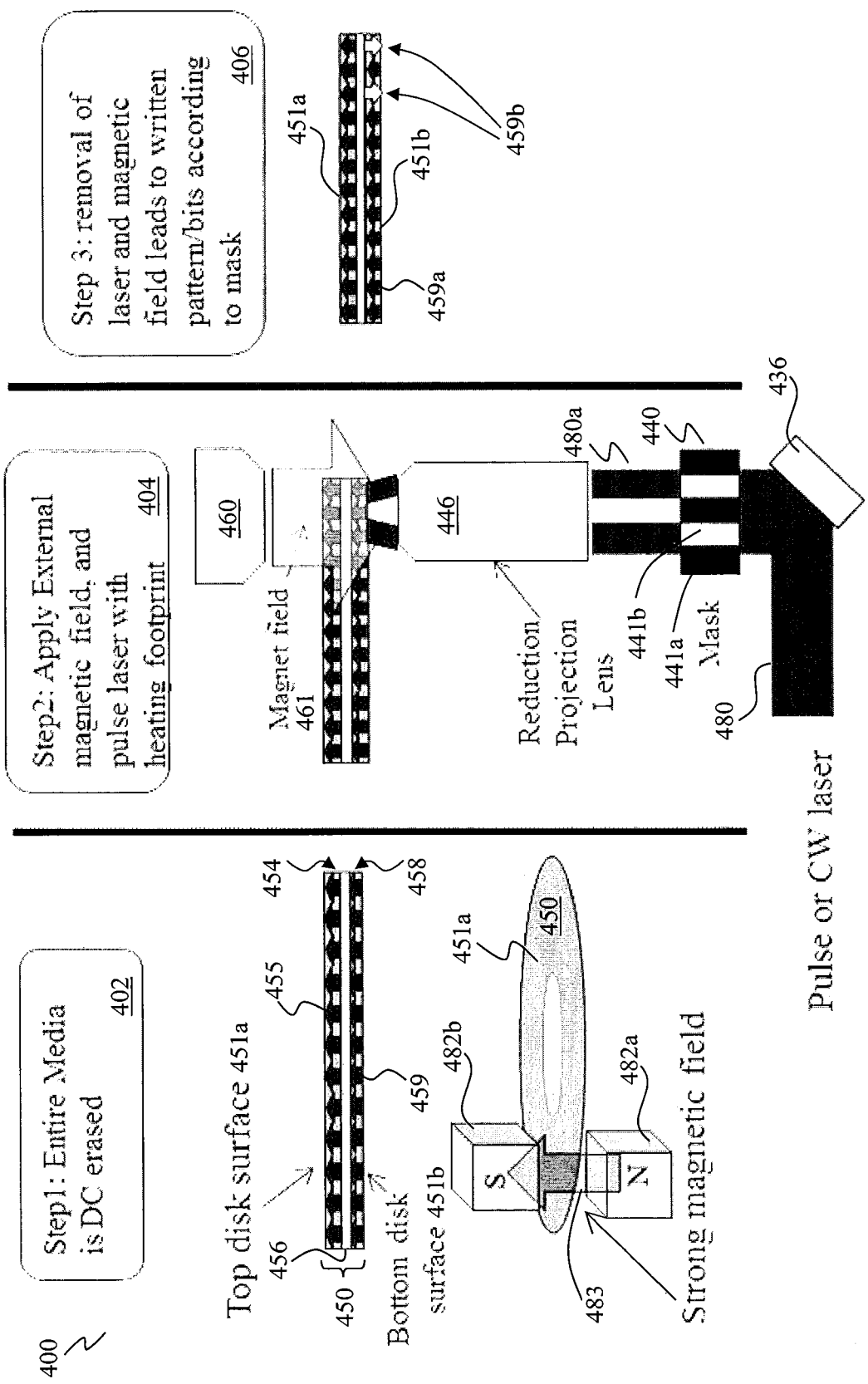
FIG. 4 shows a schematic view of the process for writing servo information, according to various embodiments.

The process for writing the servo information or servo pattern will now be described with reference to FIG. 4. The process will be described using the storage medium 450 illustrated in FIG. 4 as a non-limiting example. The storage medium 450 may be a disk, e.g. a disk in a HDD. The storage medium 450 may have a top surface 451a and a bottom surface 451b. The storage medium 450 may include a magnetic layer 454 corresponding to the top surface 451a, and another magnetic layer 458 corresponding to the bottom surface 451b while the layer 456 may be the disk substrate or carrier. The magnetic layer 454 may include a plurality of magnetic regions, represented by dark block arrows as indicated by 455 for one such arrow, while the magnetic layer 458 may include a plurality of magnetic regions, represented by dark block arrows as indicated by 459 for one such arrow. In various embodiments, the magnetic layers 454 and 458 may also each include a plurality of magnetic layers where one layer may contain data or information, while the other layer may carry servo information. For clarity and ease of understanding, only a single magnetic layer 454, and another single magnetic layer 458 are shown in FIG. 4 and described. It should be appreciated that one or more other layers may be present in the storage medium 450, although not shown.

It should be appreciated that the storage medium 450 shown may illustrate a representative storage medium with a top magnetic layer 454 at the top side of the disk substrate 456 and a bottom magnetic layer 458 at the bottom side of the disk substrate 456, where the magnetic layers 454, 458 shown on each side of the disk substrate 456 may represent at each side, both a single magnetic layer for data (single magnetic data layer) or a dedicated servo configuration or scheme including or consisting of separate data and servo layers (or separate dedicated servo and data layers).

FIG. 4 shows a schematic view of the process 400 for writing servo information or servo pattern, according to various embodiments. In Step 1 402, the entire storage medium 450 (e.g. a disk) may be DC erased. This may be achieved by applying a strong magnetic field 483 (for example via a pair of magnets 482a, 482b, with the storage medium 450 placed in between) in one direction or polarity at least substantially orthogonal to the storage medium (e.g. disk) 450 to saturate the magnetic layers (e.g. the magnetic layer 454 and the magnetic layer 458 at the top half and bottom half of the storage medium 450 respectively, where the magnetic layers 454 and 458 may each represent one or more magnetic layers including such as a data layer and a servo layer) in the storage medium 450 (on both sides). As a result, the magnetic regions 455, 459 may have magnetic orientations pointing in an upward direction, in a direction from the bottom surface 451b towards the top surface 451a. However, it should be appreciated that the magnetic orientations of the magnetic regions 455, 459 may be in a downward direction where the positions of the magnets 482a, 482b are exchanged. In various embodiments, alternatively, a weaker magnetic field may also be used in the case of heat assisted writing. In other words, in embodiments where heat may be applied to the storage medium 450, a weaker magnetic field may be employed to cause the magnetic orientations of the magnetic regions 455, 459 to align in a predetermined direction. The use of a weaker magnetic field may be sufficient as the magnetic coercivity of the magnetic regions 455, 459 may be reduced as a result of heating.

In various embodiments, depending on the type of magnet (e.g. 482a, 482b) and the size of the portion of the storage medium (e.g. disk) 450 in which the magnetic field (e.g. 483) is applied, it may be necessary to move the magnetic field across the whole storage medium 450 where the size of the storage medium 450 is larger than the region of the magnetic field. After the whole storage medium 450 has been DC erased, the magnetic field may be removed.

In Step 2, light 480 (e.g. having a wavelength of about 193 nm or about 248 nm) may be provided towards the storage medium 450. Light 480 may be provided for example by a pulsed laser or a continuous wave (CW) laser. A light director (e.g. a mirror) 436 may be provided to re-direct the propagation direction of the laser light 480. The light 480 may pass through a mask 440 which may shape the light 480. The mask 440, for example, may include one or more non-transmissive portions 441a (illustrated as black portions of the mask 440) which may selectively block part of the laser light 480, and one or more transmissive portions 441b (illustrated as white portions of the mask 440) which may selectively allow part of the laser light 480 to pass through 480. In this way, the mask 440 may provide shaping of the light 480 to correspond to the part of the storage medium 450 where the light 480 is to be incident on or irradiated onto. The light 480a that is transmitted through the mask 440 may be received by a reduction projection lens 446 and transmitted therefrom. The reduction projection 446 may assist in focusing the light 480a onto the storage medium 450.

In various embodiments, an external small localized magnetic field 461 of a direction opposite to the earlier DC erase field 483 may be applied to a part or region of the storage medium 450 which may include or receive the focused light 480a transmitted from and through the mask 440. The localized magnetic field 461 may be switched on or activated over the duration in which light 480a from the mask 440 may be irradiated and focused onto the storage medium 450.

When the light 480 is on or activated, and therefore resulting in the light 480a, there may be heating of the magnetic material at the focused region of the storage medium 450, and the magnetic coercivity of that region (e.g. magnetic region) may be reduced. This may mean that the magnetic coercivity of the magnetic regions 459 at the region/portion of the storage medium 450 which receives the light 480a may be reduced, as a result of heating by the light 480a. Thus, the small magnetic field 461 may be able to switch the magnetic regions 459 (according to the configuration of the mask 440) where the magnetic coercivity is reduced. For example, the magnetic orientation of the magnetic regions 459b (as represented by white block arrows), whose magnetic coercivity is reduced as a result of heating, may be switched from an upwardly pointing direction to a downwardly pointing direction by the applied magnetic field 461, while the magnetic orientation of the magnetic regions 459a which are not heated may remain in an upwardly direction. Once the light 480 is switched off or removed, the coercivity of the previously heated magnetic regions 459b may recover to their original value and the written magnetic pattern may be frozen in or stored.

In Step 3 406, removal of the light 480 or light source (e.g. laser) and the magnetic field 461 may lead to a written pattern/bits according to the configuration of the mask 440. The optics or optics arrangement (e.g. part of the arrangement 220) and the magnetic field 461 may then be moved relative to the storage medium (e.g. disk) 450 to write servo pattern or servo information into another region.

Servo writing or patterning over the whole storage medium (e.g. disk) (e.g. 450) will now be described. Since the light (e.g. 480) through the mask (e.g. 440) and focused onto the magnetic layer (e.g. 458) may write a small part or region of the storage medium area, it may be necessary to provide relative motion between the storage medium and the optics/magnetic field so that other parts or regions of the storage medium may also be written to generate an entire servo pattern on the storage medium.

In various embodiments, after the entire servo pattern is generated by the above-mentioned approach, a read head may be used to verify the servo pattern quality if needed.

Figure 5:
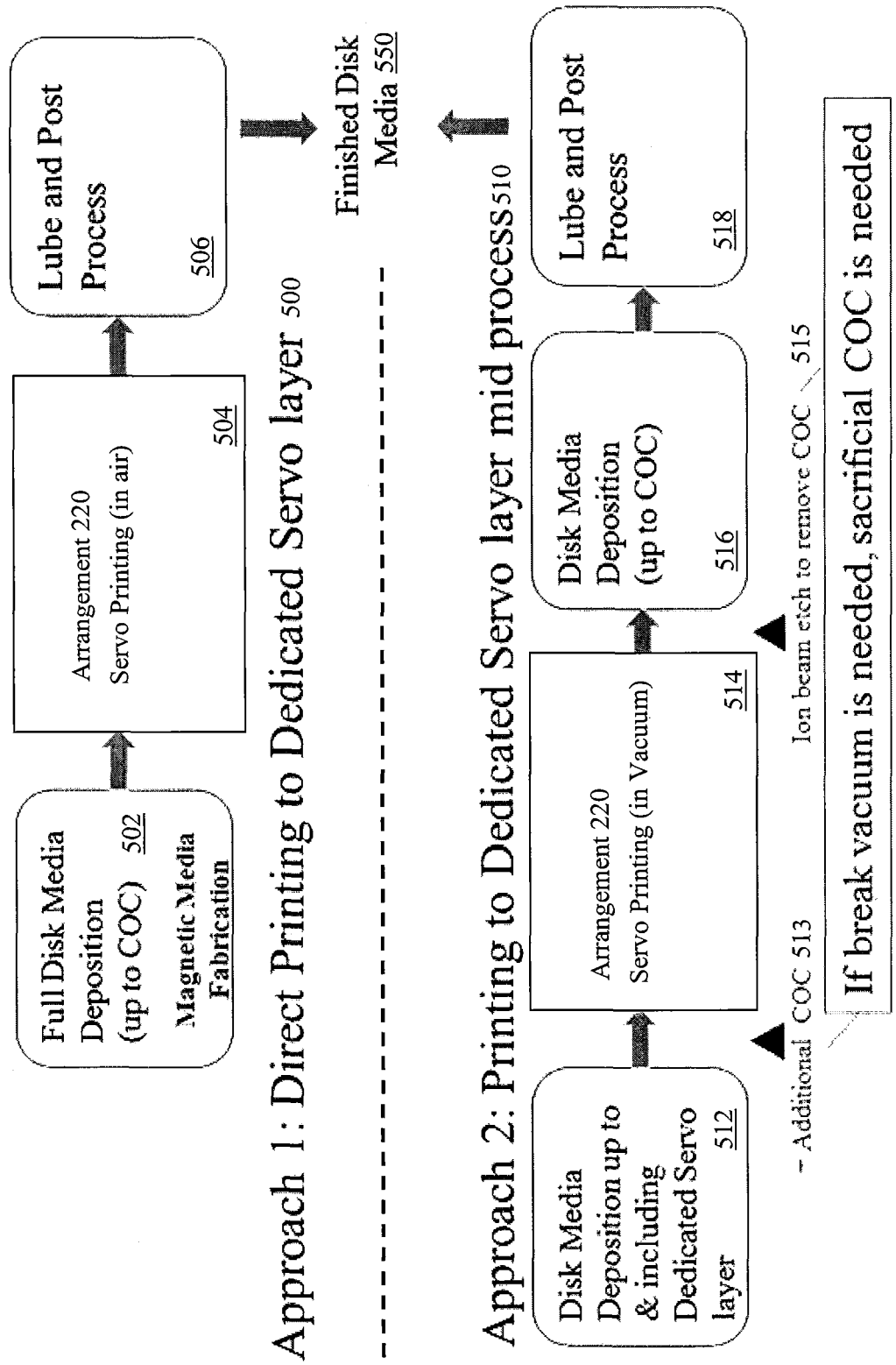
FIG. 5 shows a schematic view of the process flow with projection servo printing integrated, according to various embodiments.

Integration into an existing disk media fabrication line will now be described by way of the following non-limiting examples. The entire servo projection printing process of various embodiments may be integrated into a media fabrication line to replace current servo writing approaches for conventional disk media or be used for dedicated servo disk media. FIG. 5 shows a schematic view of the process flow with projection servo printing (servo printing) integrated, according to various embodiments. Two examples or approaches 500, 510 are illustrated in FIG. 5.

Approach 1 500 may be employed where servo printing may take place after the carbon overcoat (COC) has been deposited on the full disk media stack. At 502, magnetic media fabrication may be carried out, where full disk media deposition up to the carbon overcoat (COC) may be performed. At 504, servo printing may be carried out (e.g. in air), for example using the arrangement 220 (FIG. 2). After projection servo printing, at 506, the conventional lubricant (lube) and post process may be performed to produce a finished disk medium 550.

An alternative approach (Approach 2 510) may be employed where projection printing may take place after the dedicated servo layer has been deposited. At 512, disk media deposition up to and including the dedicated servo layer may be performed. At 514, servo printing may be carried out (e.g. in vacuum), for example using the arrangement 220 (FIG. 2). After projection printing, at 516, deposition of the remaining layers including the magnetic data layer and up to the COC may be carried out. This may then be followed by the lube and post process, at 518, to, produce a finished disk medium 550. For Approach 2 510, the servo projection printing at 514 may be carried out in vacuum. If vacuum break is needed, then a separate step, at 513, for coating a sacrificial layer such as a COC or lube may need to be added prior to servo printing at 514. The same sacrificial layer (e.g. COC) needs to be removed, at 515 for example by means of ion beam etching, after the servo printing process carried out at 514, so that the remaining deposition processes may continue.

In various embodiments, Approach 1 500 may be the preferred approach.

Disk media stack and heating and related results will now be described.

Depending on the materials of the disk media stack, the heating achieved in the target magnetic layer may vary. For example, in the case of the dedicated servo media, it may be possible to focus the light at either the disk surface or at the target servo layer or anywhere in between in order to achieve the optimal or best heating effect while preserving the desired thermal footprint and resolution corresponding to the servo or mask pattern. The heating effect at the desired magnetic servo layer may come from both the light transmitted to and absorbed by the servo layer as well as from the heat propagated from the other layers, e.g. from the data layer.

In various embodiments, heat transfer resulting from a laser light irradiated on a layer of a storage medium may be in a vertical direction into the storage medium and/or in a horizontal direction. Where vertical heat transfer may be at least substantially larger than horizontal heat transfer (e.g. vertical>>horizontal), the pattern of heating may be preserved until the bottom layers. In various embodiments, servo patterning at the top layer of the storage medium, e.g. by focusing a laser light onto the top layer (e.g. a top surface of the storage medium or at the data layer of the storage medium), may be quite doable or achievable, but servo patterning into the bottom layer (e.g. a servo layer) of the storage medium, e.g. by focusing a laser light onto the bottom layer, may be challenging. The optical constants of the top layers may determine how much light is absorbed, reflected or pass through. This may therefore affect heat transfer. At small wavelengths (e.g. UV wavelengths), high absorption may generally occur. Nevertheless, where top layers may be relatively or at least substantially transparent to UV light, then it may be possible to set the focus at the bottom layer, such as at the servo layer of the storage medium.

FIGS. 6A and 6B show schematic views illustrating focusing of a laser light at a data layer and a servo layer respectively of a storage medium, for writing servo information on the servo layer. In FIG. 6A, a laser light 623 may be received by a mask 640 which may selectively pass through a part 625 of the laser light 623 to be received by a reduction projection lens 646. The reduction projection lens 646 may focus the light part 625 onto a top recording or data layer 654 in a light pattern that may correspond to the pattern of the mask 640. The resulting heat generated at the regions 655 of the data layer 654 where light 625 is incident and focused onto may be propagated or transferred to the lower layers, for example towards a bottom servo layer 658, for example to regions 659 of the servo layer 658. A layer 690 of water may be provided on the surface of the storage medium.

In FIG. 6B, a laser light 623 may be received by a mask 640 which may selectively pass through a part 625 of the laser light 623 to be received by a reduction projection lens 647. The reduction projection lens 647 may focus the light part 625 onto a bottom servo layer 658 in a light pattern that may correspond to the pattern of the mask 640. Heat may be generated at the regions 659 of the servo layer 658 where light 625 is incident and focused onto. Broadening or focusing of the light 625 may depend on the optical constants, n, and k, of each individual layer of the storage medium above the servo layer 658.

FIG. 7A shows a schematic of an optical model 700, while FIGS. 7B and 7C show results of intensity decay based on the optical model 700. The optical model 700 shows a particular simplified disk media stack 750 (with a metallic interlayer). The disk stack 750 may include a carbon overcoat (COC) 752 (e.g. having a thickness of about 4 nm), a data layer 754 (e.g. having a thickness of about 16 nm), an interlayer or intermediate layer (e.g. a chromium-ruthenium (CrRu) layer) 756 (e.g. having a thickness of about 20 nm), a servo layer 758 (e.g. having a thickness of about 12 nm) and a further layer (e.g. a chromium-ruthenium (CrRu) layer) 760 (e.g. having a thickness of about 20 nm). Such a disk media stack 750 with separate data 754 and servo 758 layers may correspond to a dedicated servo disk media stack.

FIGS. 7B and 7C show simulation results of the optical intensity distributions for the simplified disk media stack 750 for light focused either at the top surface (beam 1 701) 751 of the disk stack 750 or at the servo layer (beam 2 703) of the disk stack 750, e.g. at a depth of about 45 nm. FIG. 7B shows results 780a corresponding to "Beam 1" 701 and results 782a corresponding to "Beam 2" 703 for the optical intensity at different depths for the disk stack 750, while FIG. 7C is a zoom-in for FIG. 7B, and shows results 780b corresponding to "Beam 1" 701 and results 782b corresponding to "Beam 2" 703 for the optical intensity less than 0.01.

As the interlayer 756 may be a metallic interlayer, e.g. a CrRu interlayer, in between two magnetic layers: the data layer 754 and the servo layer 758, the optical intensity at the servo layer 758 may be low for both cases of beam 1 701 and beam 2 703, as may be observed in FIG. 7C.

Figure 8A:
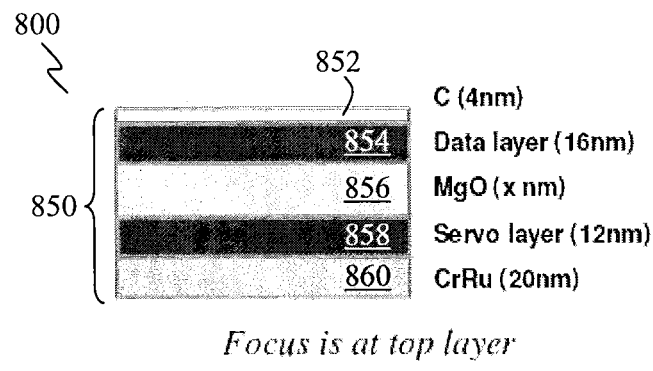
Figure 8B:
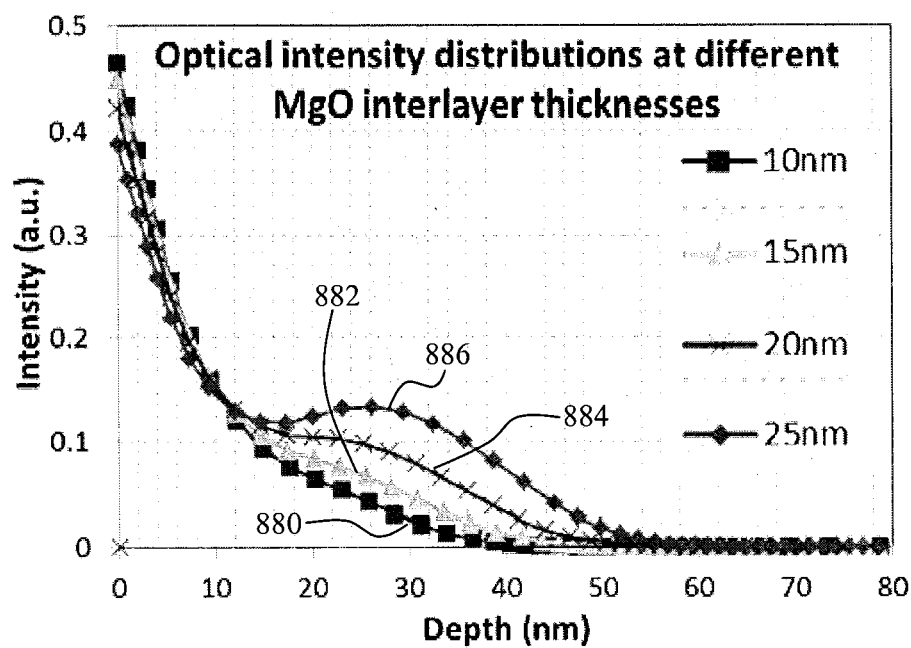
FIG. 8B shows results of intensity decay based on the optical model of FIG. 8A.

FIG. 8A shows a schematic of an optical model 800, while FIG. 8B shows results of intensity decay based on the optical model 800. The optical model 800 shows a simplified disk media stack 850 (with a non-metallic or dielectric interlayer, e.g. a magnesium oxide (MgO) layer). The disk stack 850 may include a carbon layer (e.g. COC) 852 (e.g. having a thickness of about 4 nm), a data layer (e.g. a cobalt-chromium-platinum (CoCrPt) layer) 854 (e.g. having a thickness of about 16 nm), an interlayer or intermediate layer (e.g. a MgO layer) 856 (e.g. having a thickness indicated as "x" nm), a servo layer (e.g. a cobalt-chromium-platinum (CoCrPt) layer) 858 (e.g. having a thickness of about 12 nm) and a further layer (e.g. a chromium-ruthenium (CrRu) layer) 860 (e.g. having a thickness of about 20 nm). Such a disk media stack 850 with separate data 854 and servo 858 layers may correspond to a dedicated servo disk media stack. Light may be focused at the top layer of the disk stack 850. This may for example correspond to the situation of beam 1 701 (FIG. 7A).

FIG. 8B shows simulation results of the optical intensity distribution for the simplified disk media stack 850 at the servo layer 858 for different thicknesses, x, of the MgO interlayer 856. FIG. 8B shows results 880 for MgO interlayer thickness of about 10 nm, results 882 for MgO interlayer thickness of about 15 nm, results 884 for MgO interlayer thickness of about 20 nm, and results 886 for MgO interlayer thickness of about 25 nm. As may be observed in FIG. 8B, the optical intensity at the servo layer 858 may be higher as compared to the case of a metallic interlayer (e.g. 756, FIG. 7A, and results shown in FIGS. 7B and 7C) and may provide an increased heating effect.

Figure 9:
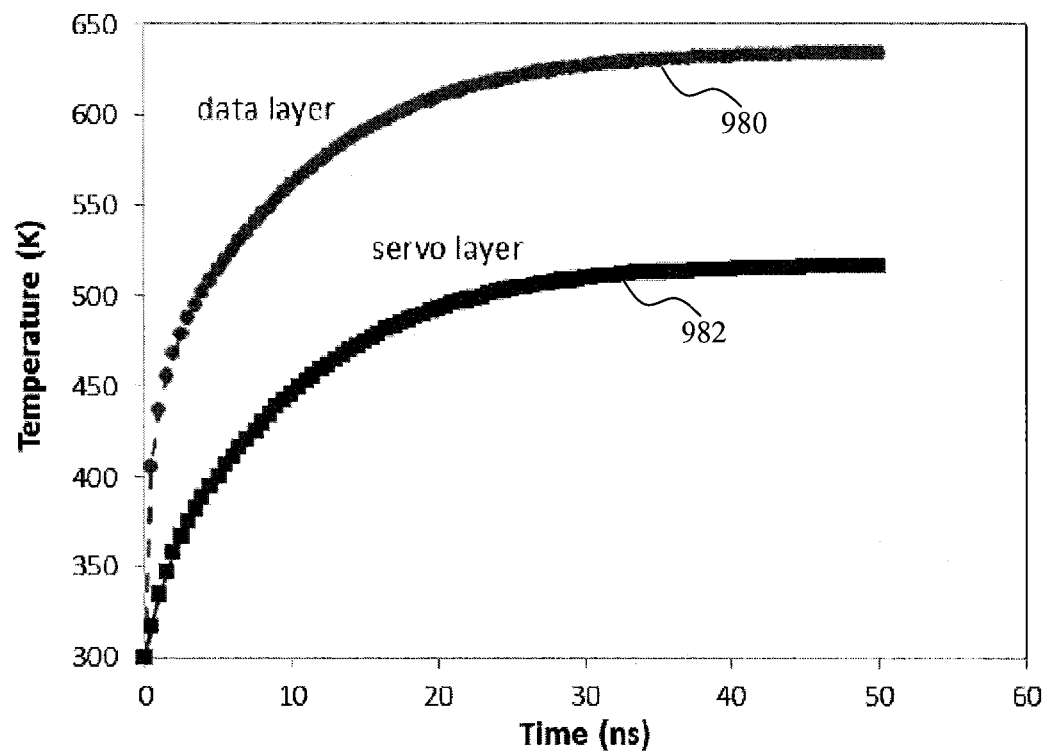
FIG. 9 shows results of temperature change based on the optical model of FIG. 8A.

FIG. 9 shows simulation results of temperature change based on the optical model 800 for an MgO interlayer thickness of about 20 nm. FIG. 9 shows results 980 of the temperature change for the data layer 854 (top layer) and results 982 for the servo layer (bottom layer) 858 for the disk media stack 850. As may be observed in FIG. 9, the results 980, 982 show a temperature rise with respect to time for the disk media stack 850 with a non-metallic interlayer, MgO layer 856.

Figure 10:
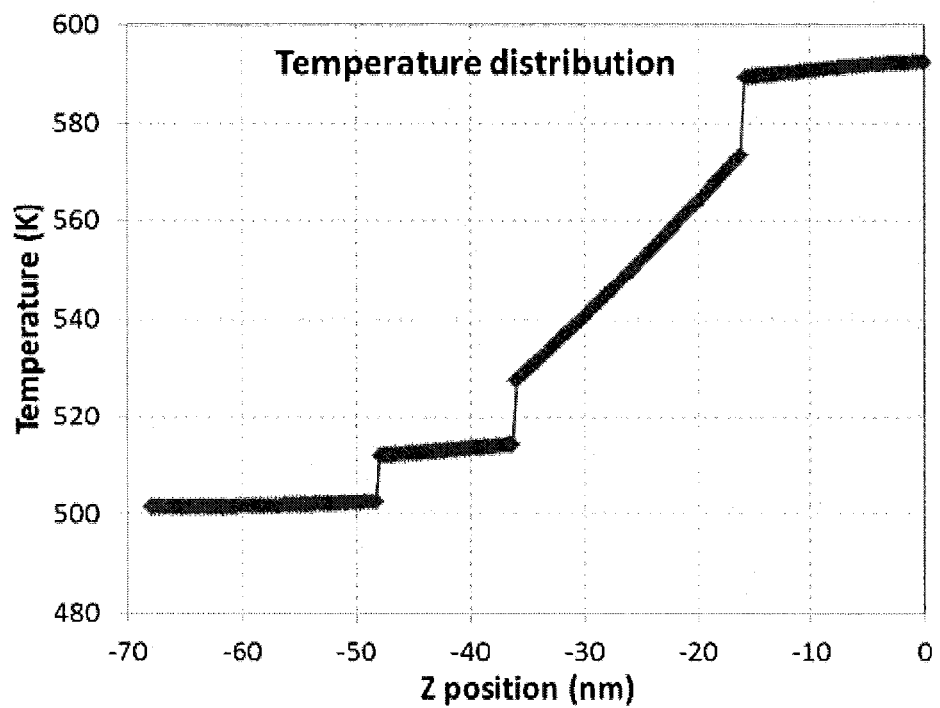
FIG. 10 shows results of temperature distribution based on the optical model of FIG. 8A.

FIG. 10 shows simulation results of temperature distribution based on the optical model 800 for an MgO interlayer thickness of about 20 nm, along the depth of the disk media stack 850, where the depth=0 refers to the top of the disk media stack 850. The results show a decrease in temperature with an increase in the depth into the disk media stack 850.

In view of the results obtained, thus, with the choice of appropriate materials for the interlayer(s) and the media stack, various embodiments may be applied to different configurations of disk media stack including dedicated servo disk media stack, those pertaining to perpendicular magnetic recording technology (PMR), as well as extending to other magnetic recording technology such as heat assisted magnetic recording (HAMR).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of writing servo information on a storage medium, the method comprising:
    applying heat to a servo portion of a storage medium;
    applying a magnetic field to the servo portion that is heated to write servo information on the servo portion,
    wherein applying heat to a servo portion of a storage medium comprises irradiating the servo portion with a laser light; and
    splitting the laser light into a first light portion to irradiate the servo portion through a first surface of the storage medium, and a second light portion to irradiate the servo portion through a second surface of the storage medium, the second surface being opposite to the first surface.

2. The method as claimed in claim 1, further comprising passing the laser light through a mask, the mask comprising:
    at least one transmissive portion configured to selectively pass a part of the laser light to irradiate at least one region of the servo portion; and
    at least one non-transmissive portion configured to selectively block another part of the laser light.

3. The method as claimed in claim 1, further comprising focusing the laser light towards the servo portion to irradiate the servo portion.

4. The method as claimed in claim 1, further comprising collimating the laser light prior to irradiating the servo portion.

5. The method as claimed in claim 1, further comprising shaping a beam profile of the laser light prior to irradiating the servo portion.

6. The method as claimed in claim 1, further comprising DC erasing the storage medium prior to applying the magnetic field to the servo portion that is heated to write the servo information on the servo portion.

7. The method as claimed in claim 1, wherein the laser light comprises an ultraviolet light.

8. The method as claimed in claim 1, wherein the servo portion is comprised in a servo layer of the storage medium, the servo layer being arranged beneath a data layer of the storage medium.

9. An arrangement for writing servo information on a storage medium, the arrangement comprising:
    an optics arrangement configured to propagate a laser light;
    a mask configured to receive the laser light, the mask comprising:
        at least one transmissive portion configured to selectively pass a part of the laser light that is received to irradiate at least one region of a servo portion of a storage medium to heat the at least one region; and
        at least one non-transmissive portion configured to selectively block another part of the laser light that is received; and
    at least one magnet configured to generate a magnetic field to the servo portion for writing servo information on the servo portion,
    wherein the optics arrangement comprises a beamsplitter configured to split the laser light into a first light portion and a second light portion, wherein the optics arrangement is configured to propagate the first light portion through the mask to irradiate the servo portion through a first surface of the storage medium, and further configured to propagate the second light portion through another mask to irradiate the servo portion through a second surface of the storage medium, the second surface being opposite to the first surface.

10. The arrangement as claimed in claim 9, wherein the optics arrangement comprises a reduction projection lens configured to focus the part of the laser light selectively passed through the mask towards the servo portion to irradiate the at least one region of the servo portion.

11. The arrangement as claimed in claim 9, wherein the optics arrangement comprises an optical collimator configured to collimate the laser light.

12. The arrangement as claimed in claim 9, wherein the optics arrangement comprises a beam homogenizer configured to shape a beam profile of the laser light.

13. The arrangement as claimed in claim 9, wherein the laser light comprises an ultraviolet light.

14. The arrangement as claimed in claim 9, wherein the servo portion is comprised in a servo layer of the storage medium, the servo layer being arranged beneath a data layer of the storage medium.

\* \* \* \* \*